(No Model.) 2 Sheets—Sheet 1.

C. O. HEGGEM.
STEERING APPARATUS FOR TRACTION ENGINES.

No. 489,865. Patented Jan. 10, 1893.

WITNESSES:— Inventor
Charles O. Heggem
By W. K. Miller
Atty.

(No Model.) 2 Sheets—Sheet 2.

C. O. HEGGEM.
STEERING APPARATUS FOR TRACTION ENGINES.

No. 489,865. Patented Jan. 10, 1893.

Witnesses
E. H. Lanie
Chas. R. Miller

Inventor
Charles O. Heggem
By W. K. Miller
Attorney

UNITED STATES PATENT OFFICE.

CHARLES O. HEGGEM, OF MASSILLON, OHIO, ASSIGNOR TO THE RUSSELL & COMPANY, OF SAME PLACE.

STEERING APPARATUS FOR TRACTION-ENGINES.

SPECIFICATION forming part of Letters Patent No. 489,865, dated January 10, 1893.

Application filed June 13, 1892. Serial No. 436,602. (No model.)

*To all whom it may concern:*

Be it known that I, CHARLES O. HEGGEM, a citizen of the United States, and a resident of Massillon, county of Stark, State of Ohio, have invented a new and useful Improvement in Steering Apparatus for Traction-Engines, of which the following is a full, clear, and exact description, reference being had to the accompanying drawings, making part of this specification.

My invention relates to an improvement in steering apparatus for traction engines, the object of which is to provide means by which the engine may be coupled with the steering apparatus to turn the guide wheels in desired direction, that is interchangeable with a hand mechanism, or that may be used conjointly.

With these ends in view my invention relates to certain features of construction and combination of parts as will be hereinafter explained and pointed out in the claims.

Figure 1:
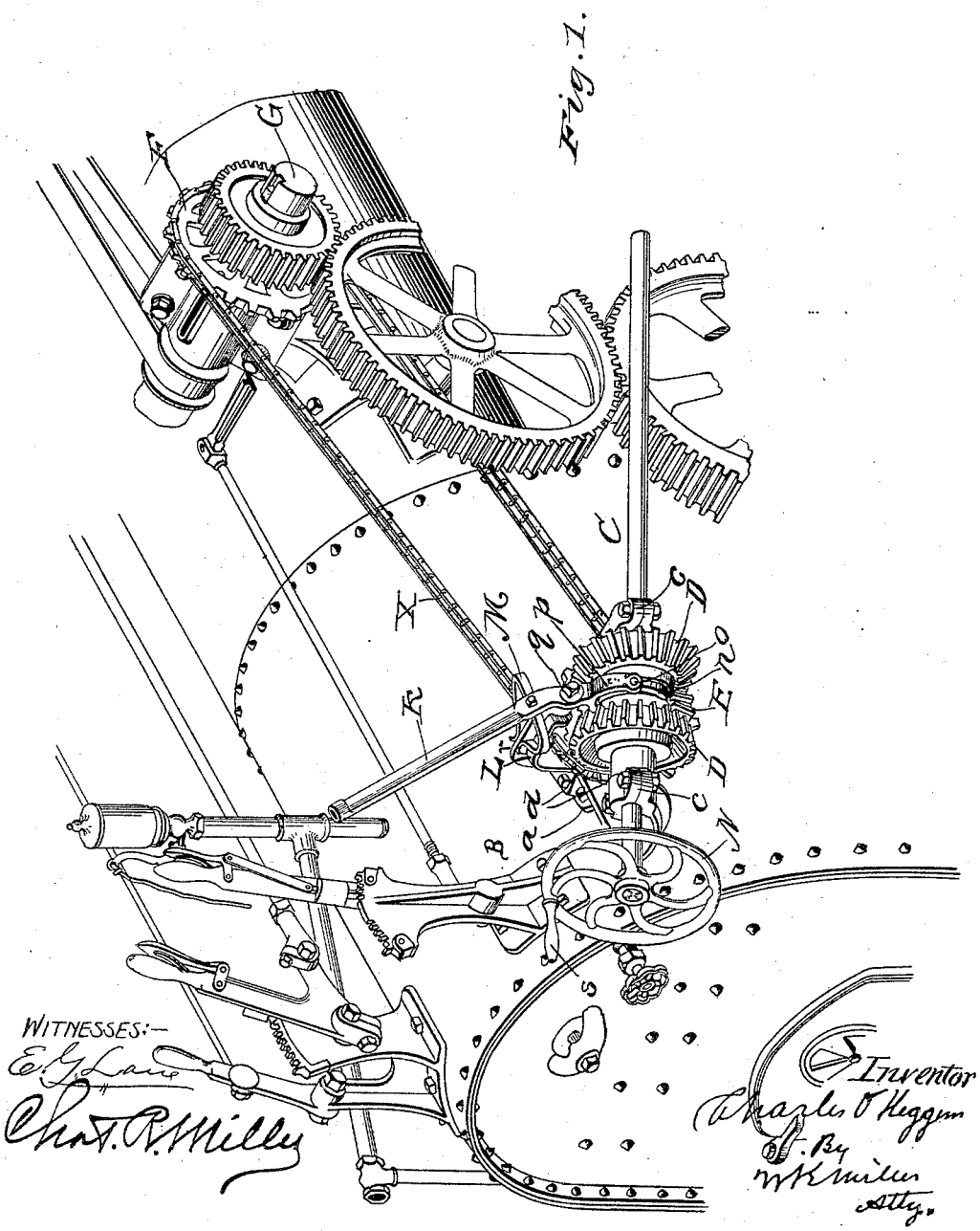
Figure 2:
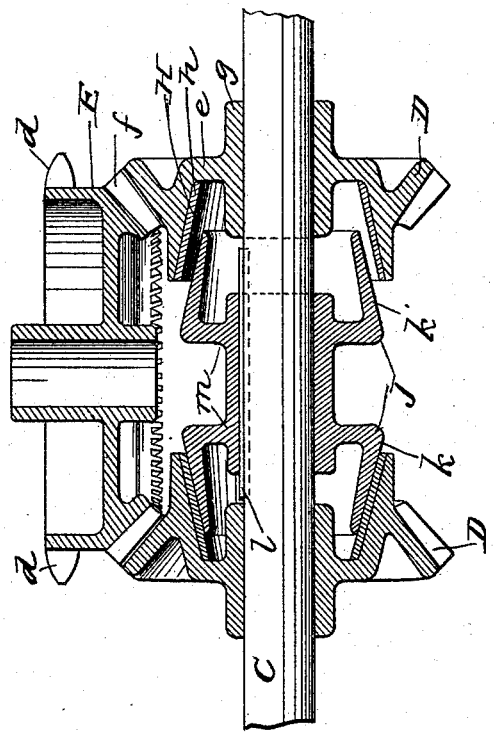
Figure 3:
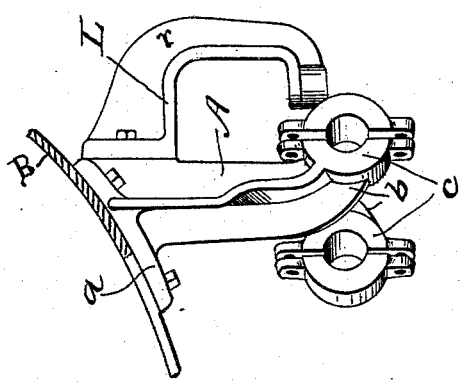

Figure 1 of the accompanying drawings is a view in perspective illustrating my invention. Fig. 2 a longitudinal horizontal section enlarged. Fig. 3 a perspective of supporting frame.

Referring to Fig. 3, A represents the supporting frame secured to the side of the boiler B, as shown in Figs. 1 and 3. The frame is substantially of the form shown having a body portion $a$ to conform to the circumference of the boiler; from the body $a$ is projected arms $b$, having at their outer end portions journal boxes $c$ in which is journaled the shaft C, as shown in Fig. 1.

On the shaft C, between the boxes $c$, face to face, are loosely mounted a distance apart, bevel wheels D, that engage a similar wheel E loosely mounted on a stud pin (not shown) central between the arms $b$ of the frame A. About the wheel E, is placed a series of sprockets $d$ that engage the links of a driving chain X that embraces the wheel E and a corresponding wheel F, on the engine shaft G, the wheels D, have a constant engagement with the wheel E, and rotate in opposite directions.

In the web $e$ of the wheels D between the teeth $f$ and the hub $g$ is provided a conical friction socket H, as shown in Fig. 2, in which I have shown a leather lining $h$.

Between the wheels D, and conical sockets H, is a sliding clutch or coupling J, having conical end portions $k$ corresponding with the socket H, and is secured against rotation on the shaft by the feather $l$; about the central portion of the clutch is provided an annular groove $m$, in which are placed shoes $n$ having trunnions $o$ that are passed into apertures in the prongs P, of a shipping lever K.

An arm L, is secured to the frame A as shown in Fig. 3 to the outer end of which the lever K is pivotally secured by the use of a sleeve and bolt $q$ as shown. A harp shaped spring M, is secured to the lever K, the free ends or prongs of which take one on each side of the rib $r$ on the arm L, by which the clutch is held out of engagement with the wheels D or sockets H.

At the lower or front end of the shaft C there may be provided a worm to engage a worm wheel mounted on a shaft suspended transverse the boiler, that serves as a windlass having a chain connection with the axle of the guide wheels, the chains to wind in opposite direction on the windlass so that as one chain is wound on the windlass the other will be unwound. I mention this as one of the well known forms of connecting a steering apparatus with the axle of the guide wheels, but there are other methods that may serve as well.

At the rear end of the shaft C, is mounted a hand wheel N, by which the shaft C, may be rotated to guide the machine; in the wheel N is placed a removable handle $s$, that may be taken from the wheel and placed in an aperture at the free end of the lever K.

In operation the machine may be steered by the use of the hand wheel, to rotate the shaft C, or when required the shaft may be engaged with one or the other of the wheels D, which are constant in their movement with the engine, by the use of the lever K to slide the clutch J, and place the cone $k$ in engagement with socket H, thus instantly converting the steering mechanism from a hand to a power mechanism. In road engines this is a matter of great importance as it not infrequently occurs that the guide wheel must be advanced against a grade or incline quickly to prevent the machine from sliding from center or crown of the highway into the ditch.

Having thus fully described the nature and operation of my invention, what I claim and desire to secure by Letters Patent is:

1. The combination in a steering apparatus for traction engines of the shaft C, supporting frame A, wheels D, loosely mounted on said shaft, a clutch J to slide on and rotate with said shaft to engage said wheels, a lever to move the clutch into such engagement, a driving wheel E having teeth to engage similar teeth on the wheels D, and a series of sprockets d, about its periphery to engage a driving chain X, that has a similar engagement with the wheel F, on the engine shaft G, substantially as described and for the purpose set forth.

2. In combination, the suitably journaled steering shaft provided with two loosely journaled gear wheels, a clutch mounted on said shaft to rotate thereon and slide into engagement with either of the aforesaid wheels, a driving wheel located between said gear wheels and continuously rotating them in opposite directions and means for shifting the clutch into engagement with either of the said gear wheels substantially as set forth.

3. In combination, the suitably journaled steering shaft C, two bevel gear wheels loosely journaled thereon, a sliding clutch to engage either of said wheels, a driving gear meshing with said bevel gears, an overhanging arm having a web r, a lever fulcrumed on said arm and a loop spring M, secured to said lever and having its branches engaging the opposite sides of said web whereby the clutch is normally held out of engagement with either of the bevel gear wheels, substantially as set forth.

In testimony whereof I have hereunto set my hand this 7th day of June, A. D. 1892.

CHARLES O. HEGGEM.

Witnesses:
W. K. MILLER,
CHAS. R. MILLER.